Dec. 1, 1925.
M. B. LOETSCHER
1,563,760
TIRE COVER
Filed Dec. 4, 1922
2 Sheets-Sheet 1
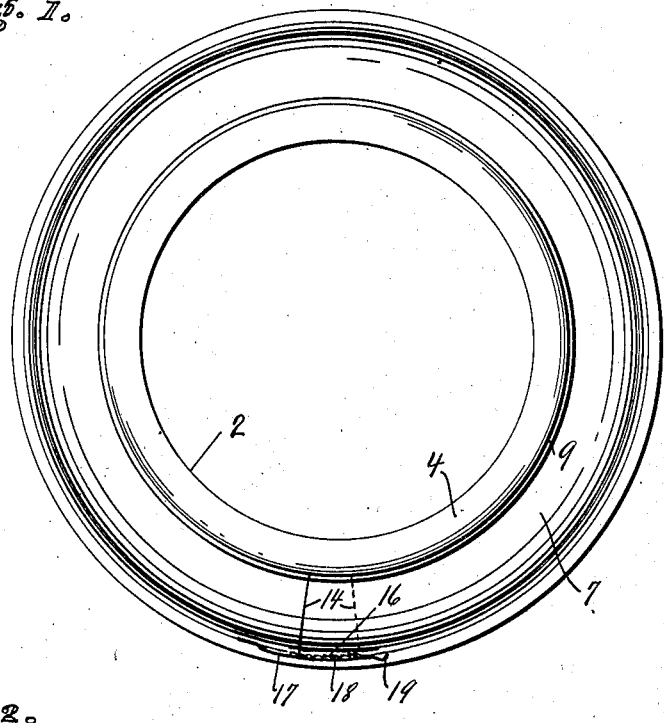
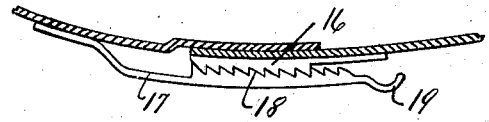
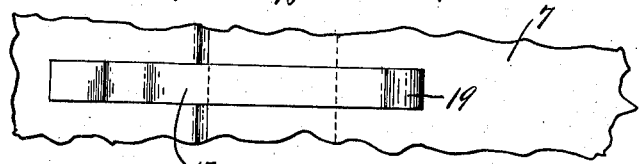
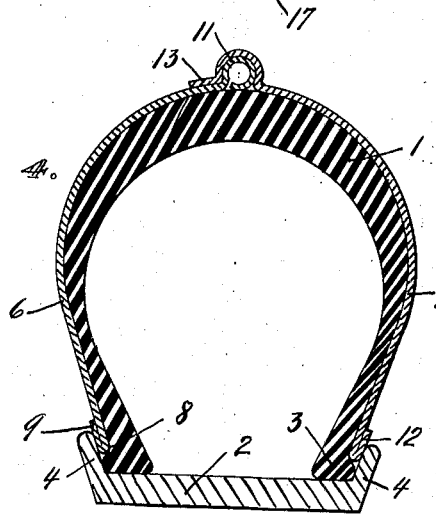
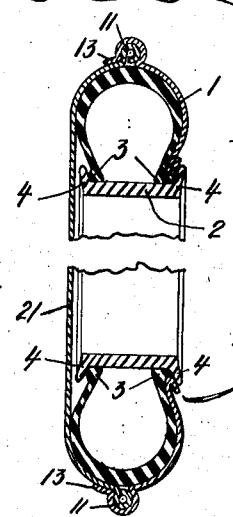
Inventor:
M. B. Loetscher
Attorneys.

Dec. 1, 1925.

M. B. LOETSCHER 1,563,760

TIRE COVER

Filed Dec. 4, 1922 2 Sheets-Sheet 2

Inventor.
M. B. Loetscher by *Mumm* *Le*
Attorneys.

Patented Dec. 1, 1925.

1,563,760

UNITED STATES PATENT OFFICE.

MARTIN B. LOETSCHER, OF HOLLYWOOD, CALIFORNIA.

TIRE COVER.

Application filed December 4, 1922. Serial No. 604,952.

*To all whom it may concern:*

Be it known that I, MARTIN B. LOETSCHER, a citizen of the United States, and a resident of Hollywood, county of Los Angeles, State of California, have invented a new and useful Tire Cover, of which the following is a specification.

The present invention relates to improvements in tire covers and its particular object is to provide a cover for a tire secured to a rim that can be very easily and quickly fastened to the tire so as to completely surround and protect the same. Two principal forms of my device are described in the specification, one being made in one piece and adapted to be sprung on the tire, and the other being made of two halves adapted to be placed on the tire from opposite sides and to be engaged with one another through spring action in combination with a certain means for fastening one of the halves. The latter form may be modified to cover, on one side, the entire area enclosed by the rim.

Figure 6:
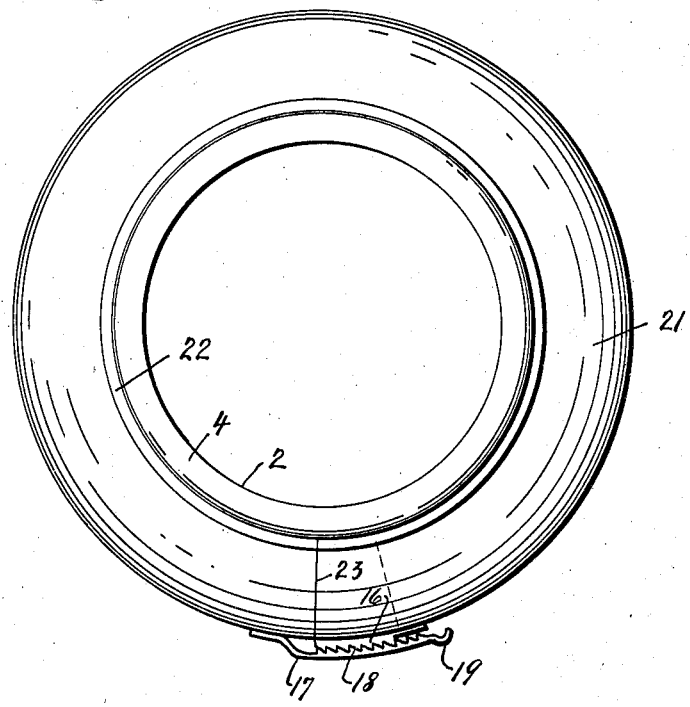
Figure 7:
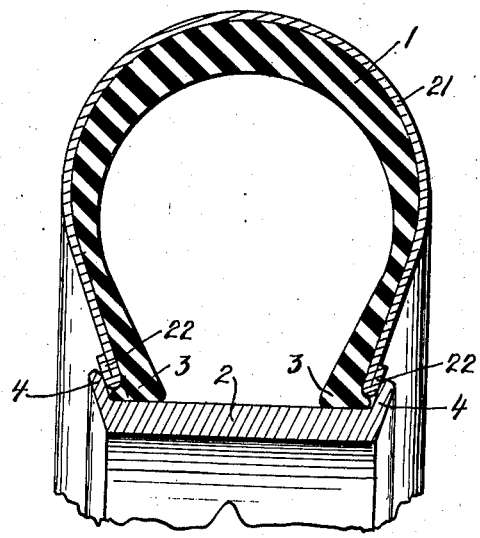

The preferred forms of my invention are shown in the accompanying drawing in which Figure 1 represents a side view of a tire having my cover thereon, Figure 2 a sectional detail view explaining a spring lock mechanism, Figure 3 a plan view of said mechanism, Figure 4 a cross section through the tire with the cover secured thereto along a radial line, Figure 5 a cross section through a modified form of the tire cover, covering the whole area enclosed by the rim, Figure 6 a modified form of tire cover in side elevation, and Figure 7 a cross-section through the same taken along any radial line. While I have shown only the preferred form of the invention it should be understood that various changes or modifications may be made within the scope of the claims hereto attached without departing from the spirit of the invention.

The tire (1) which may be of any suitable construction and form is secured on the tire rim (2) in any suitable manner as for instance by the engagement of the beads (3) with the flanges (4) of the rim. My cover, as shown in Figures 1–4, consists of two sections (6) and (7). The section (6) which is made of light metal has the form of a ring and is curved in transverse cross section as shown in Figure 4 to conform to the shape of the tire it is made for. Its inner margin (8) is turned upon itself as shown at (9) and adapted to be forced between the tire and the flange of the tire rim in the manner shown in Figure 4. The outer margin (11) of the section (6) is flanged and crimped into substantially circular form, the flange being disposed substantially in the central vertical plane of the tire.

The second section (7) is formed to complement the section (6), its inner margin being flanged in the same manner as shown at (12) and its outer margin being flanged and curved to fit around the crimped flange of section (6) with a short projection (13) extending beyond the latter. Both sections are split transversely as shown at (14) with the two ends overlapping when the cover is in place. The two ends of section (7) are secured to one another by means of the lock shown in Figures 2 and 3 comprising a ratchet (16) secured to one of the ends and the spring member (17) secured to the other end and provided with ratchet teeth (18) adapted to engage the ratchet before mentioned. A bent portion (19) forms the end of the spring (17) and allows of easy manipulation of the same.

To place the cover on the tire the section (6) is first placed in position on one side of the tire, its inner margin being forced between the tire and a flange of the same. The second section is then placed on the other side and the outer flange of the same sprung on the crimped flange of the first section which operation is made possible through the fact that the second section is split as at (14). After the second section has been placed in its proper position the two ends of the same are forced over one another as far as can conveniently be done and the ratchet arrangement shown in Figure 2 will automatically lock the whole cover.

The form thus far described may be slightly modified as shown in Figure 5, in which one section is made solid to cover the whole area of the tire as shown at (21), the engagement of the inner margin between the tire and the tire rim being eliminated.

In Figures 6 and 7 is shown a modified form in which the whole tire cover (21) is made of a single unit. The peripheral joint is omitted while the inner margin (22) is turned upon itself in the manner previously described. The cover is split transversely as shown at (23), one end overlapping the other. The locking device is arranged in a similar manner as in the other form.

To apply this cover the marginal edges (22) are forced apart at one end and sprung over the tire and thereafter the whole cover is worked over the rim gradually until it is in place when it is secured by means of the locking device.

I claim:

1. A cover for a tire rim having a tire thereon comprising an element engaging one side of the tire terminating in a crimped flange surrounding the tire peripherally, a second element adapted to engage the other side of the tire being split transversely and terminating in a flange adapted to be sprung over the crimped flange for firmly engaging the same, and means for locking the tire at the split comprising ratchet teeth associated with one end of the second element, and a spring member associated with the other end having ratchet teeth adapted to engage the former teeth.

2. A cover for a flanged tire rim having a tire supported between its flanges comprising a ring curved transversely adapted to lie against one side of the tire with one edge clamped between the tire and a rim flange and the other edge terminating in a rounded flange surrounding the tire peripherally and a second ring adapted to similarly engage the other side of the tire being split transversely and terminating in a rounded flange adapted to be sprung over the first rounded flange for firmly engaging the same.

3. A cover for a flanged tire rim having a tire supported between its flanges comprising a ring curved transversely adapted to lie against one side of the tire with one edge clamped between the tire and a rim flange and the other edge terminating in a crimped flange surrounding the tire peripherally, a second ring adapted to similarly engage the other side of the tire being split transversely and terminating in a flange adapted to be sprung over the crimped flange for firmly engaging the same, and means for locking the tire at the split, comprising ratchet teeth associated with one end of the second element, and a spring member associated with the other end having ratchet teeth adapted to engage the former teeth.

4. A cover for a tire mounted on a tire rim having retaining flanges thereon, comprising a casing made to conform to the outlines of the tire and split transversely so as to be adapted to be sprung on the same having its marginal edges turned upon itself to fit between the tire and the flanges of the rim, and means for locking the cover in its operative position comprising ratchet teeth associated with one end of the cover and a spring member associated with the other end having ratchet teeth adapted to engage the former teeth.

MARTIN B. LOETSCHER.